US009273670B2

(12) United States Patent
Li et al.

(10) Patent No.: US 9,273,670 B2
(45) Date of Patent: Mar. 1, 2016

(54) COOLING SYSTEM AND METHOD FOR WIND POWER GENERATOR AND WIND POWER GENERATOR SET (71) Applicant: BEIJING GOLDWIND SCIENCE & CREATION WINDPOWER EQUIPMENT CO., LTD., Beijing (CN)

(72) Inventors: Xiaoqian Li, Beijing (CN); Guoqing Wu, Beijing (CN); Kai Wu, Beijing (CN)

(73) Assignee: Beijing Goldwind Science & Creation Windpower Equipment Co., Ltd., Beijing (CN)

( * ) Notice: Subject to any disclaimer, the term of this patent is extended or adjusted under 35 U.S.C. 154(b) by 0 days.

(21) Appl. No.: 14/381,584

(22) PCT Filed: Feb. 22, 2013

(86) PCT No.: PCT/CN2013/071765
§ 371 (c)(1),
(2) Date: Aug. 27, 2014

(87) PCT Pub. No.: WO2013/127314
PCT Pub. Date: Sep. 6, 2013

(65) Prior Publication Data
US 2015/0108756 A1 Apr. 23, 2015

(30) Foreign Application Priority Data

Mar. 1, 2012 (CN) .......................... 2012 1 0051358

(51) Int. Cl.
*F03D 11/00* (2006.01)
*F03D 7/02* (2006.01)
(Continued)

(52) U.S. Cl.
CPC .............. *F03D 7/0272* (2013.01); *F03D 9/002* (2013.01); *F03D 11/00* (2013.01); *H02K 9/04* (2013.01); *F05B 2260/20* (2013.01); *H02K 7/1838* (2013.01); *Y02E 10/722* (2013.01)

(58) Field of Classification Search
CPC ........................................................ F03D 11/00
USPC ............................................................. 290/55
See application file for complete search history.

(56) References Cited

U.S. PATENT DOCUMENTS 7,057,305 B2 * 6/2006 Kruger-Gotzmann et al. . 290/55
8,047,774 B2 11/2011 Bagepalli
(Continued)

FOREIGN PATENT DOCUMENTS

CN 101672255 3/2010
CN 101705921 5/2010
(Continued)

OTHER PUBLICATIONS

International Search Report from the State Intellectual Property Office of the P.R. China for International Application No. PCT/CN2013/071765 mailed Jun. 6, 2013.
(Continued)

*Primary Examiner* — Joseph Waks
(74) *Attorney, Agent, or Firm* — Finnegan, Henderson, Farabow, Garrett & Dunner, LLP (57) ABSTRACT A cooling system and method for a wind power generator and a wind power generator set. The cooling system for a wind power generator includes air extraction pipelines and air discharge devices. The air extraction pipelines are located inside a generator case. A pipeline inlet in communication with a generator, a first pipeline outlet in communication with the outside of the generator case, and a second pipeline outlet in communication with the inside of the generator case are arranged on the air extraction pipelines, and the first and second pipeline outlets are provided with air doors.

16 Claims, 4 Drawing Sheets (51) Int. Cl.
*H02K 9/04* (2006.01)
*F03D 9/00* (2006.01)
*H02K 7/18* (2006.01)

(56) References Cited

U.S. PATENT DOCUMENTS

| | | | |
|---|---|---|---|
| 8,476,784 B2* | 7/2013 | Sato et al. | 290/55 |
| 8,601,804 B2* | 12/2013 | Akashi et al. | 60/398 |
| 2006/0145484 A1 | 7/2006 | Kruger-Gotzmann et al. | |
| 2010/0061853 A1 | 3/2010 | Bagepalli | |
| 2011/0163545 A1* | 7/2011 | Hirai et al. | 290/44 |
| 2011/0204652 A1* | 8/2011 | Sato et al. | 290/1 B |
| 2011/0254280 A1* | 10/2011 | Hirai et al. | 290/55 |
| 2011/0272949 A1* | 11/2011 | Matsuo et al. | 290/55 |
| 2012/0025541 A1 | 2/2012 | Hirai et al. | |

FOREIGN PATENT DOCUMENTS

| | | |
|---|---|---|
| CN | 102220944 | 10/2011 |
| CN | 202001217 | 10/2011 |
| EP | 1381143 A1 | 1/2004 |
| EP | 2143943 A1 | 1/2010 |
| EP | 2163761 | 3/2010 |
| JP | 2012013003 | 1/2012 |
| WO | WO 2006032515 A1 * | 3/2006 |
| WO | WO 2012/002466 | 1/2012 |

OTHER PUBLICATIONS

Supplementary European Search Report issued in European Patent Application No. 13754481.3, dated Oct. 14, 2015 (4 pages).

* cited by examiner

PRIOR ART

COOLING SYSTEM AND METHOD FOR WIND POWER GENERATOR AND WIND POWER GENERATOR SET

CROSS REFERENCE TO RELATED PATENT APPLICATIONS

The present application is the national phase of International Application No. PCT/CN2013/071765, titled "COOLING SYSTEM AND METHOD FOR WIND POWER GENERATOR AND WIND POWER GENERATOR SET", filed on Feb. 22, 2013, which claims the priority of Chinese Patent Application No. 201210051358.8, entitled "SYSTEM AND METHOD FOR COOLING WIND TURBINE GENERATORS AND WIND TURBINE GENERATOR SYSTEM", filed with the Chinese State Intellectual Property Office on Mar. 1, 2012, both of which applications are incorporated herein in their entireties by this reference.

FIELD

The present application relates to the field of wind power technology, and more particularly to a system and a method for cooling wind turbine generators, and a wind turbine generator system.

BACKGROUND

Figure 1:
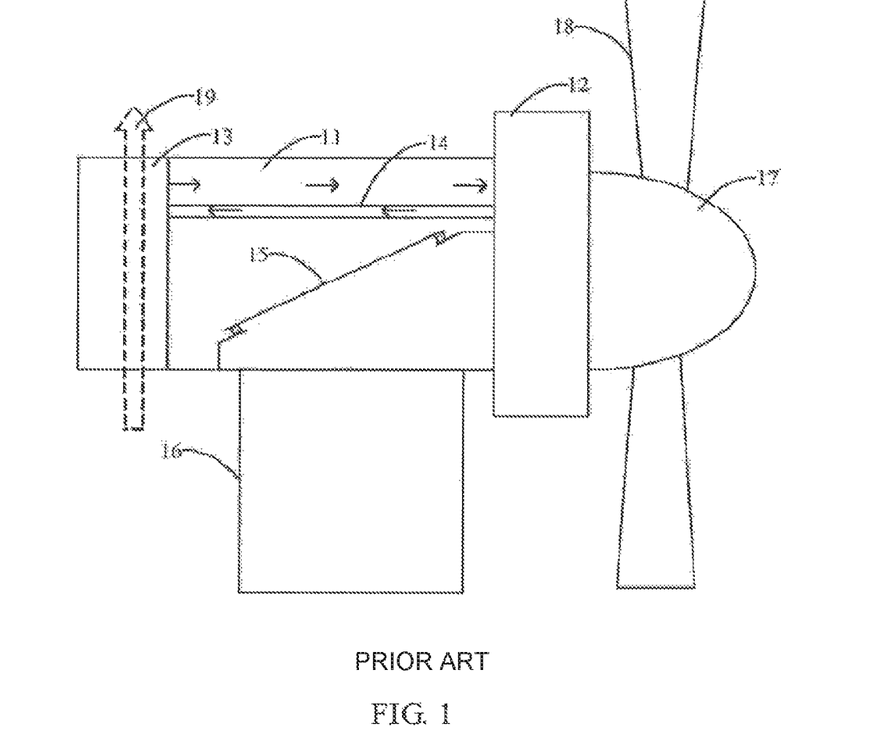
FIG. 1 is a schematic view showing the structure of a wind turbine generator system in the conventional technology.

FIG. 1 is a schematic view showing the structure of a wind turbine generator system in the conventional technology. As shown in FIG. 1, the wind turbine generator system includes a nacelle 11, a generator 12, a cooling device 13, an air extraction pipe 14, a base 15, a tower 16, a hub 17 and a blade 18. The cooling device 13, the air extraction pipe 14 and the base 15 are arranged in the nacelle 11. The nacelle 11 is arranged on the tower 16 via the base 15, and the tower 16 is used to support the nacelle 11. The blade 18 is connected to the generator 12 via the hub 17, and the blade 18 rotates to drive a rotor shaft of the generator 12 to rotate to produce electricity. The generator 12 is a major energy conversion component of the wind turbine generator system, but also a major heat generating component, that is, the generator 12 generates heat during operation. To ensure the normal operation of the generator 12, a cooling system is required to cool the generator 12. As shown in FIG. 1, the cooling device 13 and the air extraction pipe 14 are used to cool the generator 12. The air extraction pipe 14 has one end connected to the generator 12 and another end connected to the cooling device 13, and the air extraction pipe 14 is used to extract hot air generated by the generator 12 during operation and convey the hot air into the cooling device 13. The hot air is cooled by external air flow flowing in a cooling air flow passage 19 arranged in the cooling device 13, and the cooling device 13 conveys the obtained cold air back to the generator 12 to cool the generator 12. The conventional cooling system for a wind turbine generator system is an air-air heat exchange system.

When the wind turbine generator system is in a high-temperature environment, a temperature difference between the ambient temperature and the generator temperature is small, which leads to a poor cooling effect of the external air flow in the cooling air flow passage on the hot air generated by the generator, thereby reducing the cooling efficiency of the generator.

When the wind turbine generator system is in a low-temperature environment, the temperature difference between the ambient temperature and the generator temperature is large, thus the system for cooling the wind turbine generator system may stop, and the hot air generated by the generator may dissipate into the environment due to the large temperature difference, thereby cooling the generator. In this case, if the wind turbine generator system stops, the temperature in the nacelle will be close to the ambient temperature, and before restarting the wind turbine generator system, the temperature in the nacelle needs to be raised to the normal operating temperature for various parts and components and electrical elements. Generally, to make the temperature in the nacelle reach the operating temperature for various components, multiple independent heating devices need to be provided for parts and components of the wind turbine generator system, which will increase the cost and energy consumption.

SUMMARY

A system and a method for cooling wind turbine generators, and a wind turbine generator system are provided according to the present application to improve the cooling efficiency of the generator in a case that the wind turbine generator system is in a high-temperature environment and reduce the cost and energy consumption in a case that the wind turbine generator is in a low-temperature environment.

To realize the above objects, a system for cooling wind turbine generators is provided according to the present application, which includes an air extraction pipe and an air exhaust device, wherein the air extraction pipe is located in a nacelle and is provided with a pipe inlet, a first pipe outlet and a second pipe outlet, the pipe inlet is in communication with a generator, the first pipe outlet is provided with a first pipe air damper, and the second pipe outlet is provided with a second pipe air damper;

in a case that a temperature of the generator is higher than a first set temperature and a temperature of the nacelle is higher than a second set temperature, the first pipe air damper is configured to be opened to communicate the first pipe outlet with an outside of the nacelle;

in a case that the temperature of the nacelle is lower than or equal to the second set temperature, the second pipe air damper is configured to be opened to communicate the second pipe outlet with an inside of the nacelle; and in a case that the temperature of the generator is higher than the first set temperature and the temperature of the nacelle is higher than the second set temperature, the air exhaust device is configured to extract hot air generated by the generator into the air extraction pipe through the pipe inlet and exhaust the hot air to the outside of the nacelle through the first pipe outlet; and in a case that the temperature of the nacelle is lower than or equal to the second set temperature, the air exhaust device is configured to extract the hot air generated by the generator into the air extraction pipe through the pipe inlet and exhaust the hot air to the inside of the nacelle through the second pipe outlet.

Further, the air extraction pipe includes a main pipe and a branch pipe, one end of the main pipe is the pipe inlet and another end of the main pipe is the first pipe outlet, and one end of the branch pipe is in communication with the main pipe and another end of the branch pipe is the second pipe outlet.

Further, the air exhaust device includes a first air exhaust unit and a second air exhaust unit, the first air exhaust unit is located near the first pipe outlet in the air extraction pipe, and the second air exhaust unit is located near the second pipe outlet in the air extraction pipe;

in a case that the temperature of the generator is higher than the first set temperature and the temperature of the nacelle is higher than the second set temperature, the first air exhaust unit is configured to extract the hot air generated by the generator into the air extraction pipe through the pipe inlet and exhaust the hot air to the outside of the nacelle through the first pipe outlet; and in a case that the temperature of the nacelle is lower than or equal to the second set temperature, the second air exhaust unit is configured to extract the hot air generated by the generator into the air extraction pipe through the pipe inlet and exhaust the hot air to the inside of the nacelle through the second pipe outlet.

Further, a rotational frequency of the first air exhaust unit is adjustable according to the temperature of the generator, and a rotational frequency of the second air exhaust unit is adjustable according to the temperature of the nacelle.

Further, the main pipe includes a first pipe segment and a second pipe segment, the first pipe segment is starting from an intersection of the main pipe and the branch pipe to the first pipe outlet, the second pipe segment is starting from the intersection of the main pipe and the branch pipe to the pipe inlet, and the air exhaust device is located in the second pipe segment.

To realize the above objects, a wind turbine generator system is provided according to the present application, which includes a generator, a nacelle, a hub, blades and a system for cooling a wind turbine generator. The blades are connected to the generator through the hub.

Further, the wind turbine generator system includes a heating device arranged on the air extraction pipe; and the heating device is configured to heat the nacelle.

Further, the wind turbine generator system includes a base and a tower, the base is arranged in the nacelle, the nacelle is arranged on the tower via the base, and the tower is configured to support the nacelle.

Further, a sealing cover is arranged above the base, the sealing cover is mounted on the base via a sealing gasket and is provided with an air filter apparatus, and the air filter apparatus is configured to filter air entering the nacelle from the tower.

To realize the above objects, a method for cooling wind turbine generators is provided according to the present application based on the system for cooling wind turbine generators, wherein the system for cooling wind turbine generators includes an air extraction pipe and an air exhaust device, the air extraction pipe is located in a nacelle and is provided with a pipe inlet, a first pipe outlet and a second pipe outlet, the pipe inlet is in communication with a generator, the first pipe outlet is provided with a first pipe air damper, and the second pipe outlet is provided with a second pipe air damper;

the method includes:

monitoring a temperature of the generator and a temperature of the nacelle;

in a case that the temperature of the generator is higher than a first set temperature and the temperature of the nacelle is higher than a second set temperature, opening the first pipe air damper to communicate the first pipe outlet with an outside of the nacelle; and extracting, by the air exhaust device, hot air generated by the generator into the air extraction pipe through the pipe inlet and exhausting, by the air exhaust device, the hot air to the outside of the nacelle through the first pipe outlet; and in a case that the temperature of the nacelle is lower than or equal to the second set temperature, opening the second pipe air damper to communicate the second pipe outlet with an inside of the nacelle; and extracting, by the air exhaust device, hot air generated by the generator into the air extraction pipe through the pipe inlet and exhausting, by the air exhaust device, the hot air to the inside of the nacelle through the second pipe outlet.

The present application has the following advantageous effects:

In the technical solutions of the system and method for cooling wind turbine generators and the wind turbine generator system provided in the present application, in a case that the temperature of the generator is higher than the first set temperature and the temperature of the nacelle is higher than the second set temperature, the first pipe air damper is opened, and the air exhaust device extracts the hot air generated by the generator into the air extraction pipe through the pipe inlet and exhausts the hot air to the outside of the nacelle through the first pipe outlet, thereby improving the cooling efficiency of the generator when the wind turbine generator system is in a high-temperature environment. In a case that the temperature of the nacelle is lower than or equal to the second set temperature, the second pipe air damper is opened, and the air exhaust device extracts the hot air generated by the generator into the air extraction pipe through the pipe inlet and exhausts the hot air to the inside of the nacelle through the second pipe outlet, so as to raise the temperature in the nacelle to a set temperature or keeping the temperature in the nacelle at the set temperature when the wind turbine generator system is in a low-temperature environment, thereby avoiding the need for providing multiple independent heating devices for parts and components of the wind turbine generator system, and reducing the cost and energy consumption.

DETAILED DESCRIPTION OF THE EMBODIMENTS

To make the person skilled in the art better understand the technical solutions of the present application, a system and a method for cooling wind turbine generators and a wind turbine generator system provided in the present application will be described in detail in conjunction with the accompanying drawings.

Figure 2:
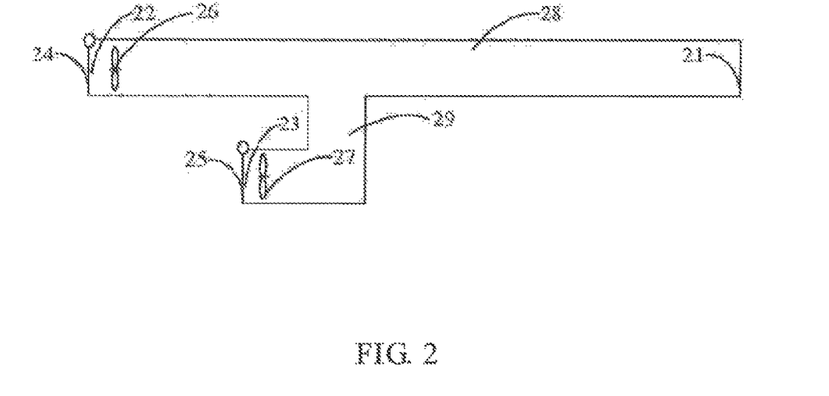
FIG. 2 is a schematic view showing the structure of a system for cooling wind turbine generators according to a first embodiment of the present application.

FIG. 2 is a schematic view showing the structure of a system for cooling wind turbine generators according to a first embodiment of the present application. As shown in FIG. 2, the system for cooling wind turbine generators includes an air extraction pipe and an air exhaust device. The air extraction pipe is located in a nacelle, and is provided with a pipe inlet 21, a first pipe outlet 22 and a second pipe outlet 23. The pipe inlet 21 is in communication with a generator, the first pipe outlet 22 is provided with a first pipe air damper 24, and the second pipe outlet 23 is provided with a second pipe air damper 25. In a case that a temperature of the generator is higher than a first set temperature and a temperature of the nacelle is higher than a second set temperature, the first pipe air damper 24 is opened to communicate the first pipe outlet 22 with the outside of the nacelle. In a case that the temperature of the nacelle is lower than or equal to the second set temperature, the second pipe air damper 25 is opened to communicate the second pipe outlet 23 with the inside of the nacelle. In a case that the temperature of the generator is higher than the first set temperature and the temperature of the nacelle is higher than the second set temperature, the air exhaust device extracts hot air generated by the generator into the air extraction pipe through the pipe inlet 21 and exhausts the hot air to the outside of the nacelle through the first pipe outlet 22; and in a case that the temperature of the nacelle is lower than or equal to the second set temperature, the air exhaust device extracts the hot air generated by the generator into the air extraction pipe through the pipe inlet 21 and exhausts the hot air to the inside of the nacelle through the second pipe outlet 23.

In this embodiment, the air extraction pipe includes a main pipe 28 and a branch pipe 29. The main pipe 28 has one end functioning as the pipe inlet 21 and another end functioning as the first pipe outlet 22. The branch pipe 29 has one end in communication with the main pipe 28 and another end functioning as the second pipe outlet 23. In practical application, the air extraction pipe may be in other structures which are not detailed here.

In this embodiment, the air exhaust device may further include a first air exhaust unit 26 and a second air exhaust unit 27. The first air exhaust unit 26 is located near the first pipe outlet 22 in the air extraction pipe, and the second air exhaust unit 27 is located near the second pipe outlet 23 in the air extraction pipe. In a case that the temperature of the generator is higher than the first set temperature and the temperature of the nacelle is higher than the second set temperature, the first air exhaust unit 26 is used to extract the hot air generated by the generator into the air extraction pipe through the pipe inlet 21 and exhaust the hot air to the outside of the nacelle through the first pipe outlet 22. In a case that the temperature of the nacelle is lower than or equal to the second set temperature, the second air exhaust unit 27 is used to extract the hot air generated by the generator into the air extraction pipe through the pipe inlet 21 and exhaust the hot air to the inside of the nacelle through the second pipe outlet 23. In this embodiment, one or more of the first air exhaust units 26 may be provided, and one or more of the second air exhaust units 27 may be provided. The first air exhaust unit 26 and the second air exhaust unit 27 may each be an exhaust fan.

In this embodiment, a temperature sensor may be used to monitor the temperature of the generator and the temperature of the nacelle. A central processing unit of the wind turbine generator system may be used to open or close the first air exhaust unit 26 and the first pipe air damper 24, or open or close the second air exhaust unit 27 and the second pipe air damper 25.

The operating principles of the system for cooling wind turbine generators in this embodiment will be described in detail in conjunction with FIGS. 3 and 4.

Figure 3:
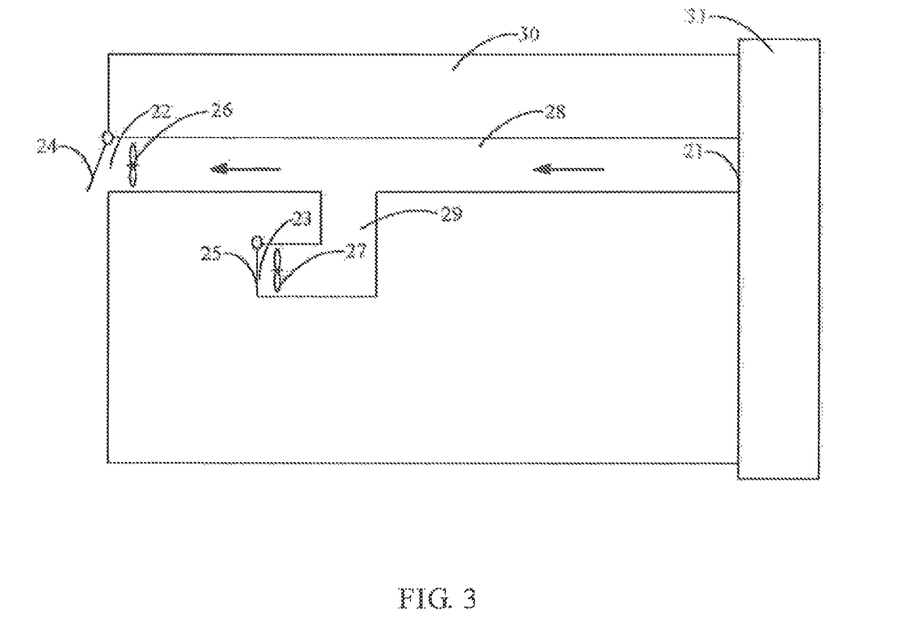
FIG. 3 is an operation schematic diagram of the system for cooling wind turbine generators in the first embodiment.

FIG. 3 is an operation schematic diagram of the system for cooling wind turbine generators in the first embodiment. As shown in FIG. 3, after the generator 31 is started, in a case that the temperature of the generator 31 is higher than the first set temperature and the temperature of the nacelle 30 is higher than the second set temperature, the first air exhaust unit 26 is started and the first pipe air damper 24 is opened, thus the first pipe outlet 22 is communicated with the outside of the nacelle 30. The first air exhaust unit 26 extracts the hot air generated by the generator 31 into the air extraction pipe through the pipe inlet 21 and exhausts the hot air to the outside of the nacelle 30 through the first pipe outlet 22. At this time, the second air exhaust unit 27 is shut and the second pipe air damper 25 is closed. A rotational frequency of the first air exhaust unit 26 may be adjusted according to the temperature of the generator 31, so as to realize an object of controlling the flow rate of the hot air according to the temperature of the generator 31, thus two objects of improving the cooling efficiency of the generator 31 and reducing the energy consumption of the first air exhaust unit 26 may be balanced. In detail, when the temperature of the generator 31 rises, the rotational frequency of the first air exhaust unit 26 is increased to speed up the flow rate of the hot air, so as to exhaust the hot air faster to the outside of the nacelle 30 through the first pipe outlet 22, thereby improving the cooling effect of the generator 31. When the temperature of the generator 31 drops, the rotational frequency of the first air exhaust unit 26 is decreased to slow down the flow rate of the hot air, thereby reducing the energy consumption of the first air exhaust unit 26 during operation while ensuring the cooling effect of the generator 31. FIG. 3 may be an operating status of the system for cooling wind turbine generators when the wind turbine generator system is in a high-temperature environment.

Figure 4:
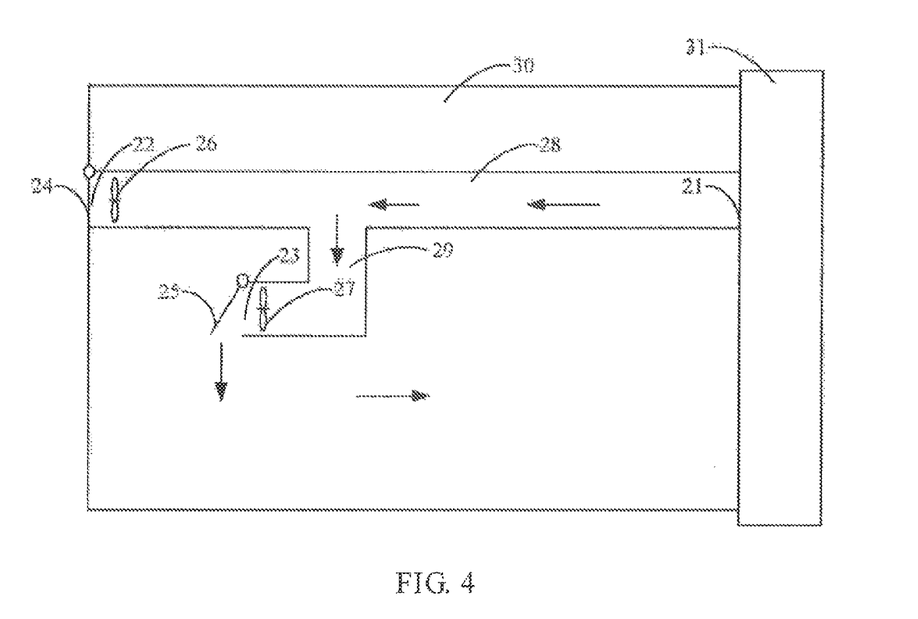
FIG. 4 is another operation schematic diagram of the system for cooling wind turbine generators in the first embodiment.

FIG. 4 is another operation schematic diagram of the system for cooling wind turbine generators in the first embodiment. As shown in FIG. 4, after the generator 31 is started, in a case that the temperature of the nacelle 30 is lower than or equal to the second set temperature, the second air exhaust unit 27 is started and the second pipe air damper 25 is opened, thus the second pipe outlet 23 is communicated with the inside of the nacelle 30. The second air exhaust unit 27 extracts the hot air generated by the generator 31 into the air extraction pipe through the pipe inlet 21 and exhausts the hot air to the inside of the nacelle 30 through the second pipe outlet 23, which raises the temperature in the nacelle 30, thereby realizing the heat preservation of the nacelle 30. At this time, the first air exhaust unit 26 is shut and the first pipe air damper 24 is closed. A rotational frequency of the second air exhaust unit 27 may be adjusted according to the temperature of the nacelle 30, so as to realize an object of controlling the flow rate of the hot air according to the temperature of the nacelle 30, thus two objects of ensuring the heat preservation of the nacelle 30 and reducing the energy consumption of the second air exhaust unit 27 may be balanced. In detail, when the temperature of the nacelle 30 drops, the rotational frequency of the second air exhaust unit 27 is increased to speed up the flow rate of the hot air, so as to exhaust the hot air faster to the inside of the nacelle 30 through the second pipe outlet 23, thereby improving the heat preservation in the nacelle 30. When the temperature in the nacelle 30 rises, the rotational frequency of the second air exhaust unit 27 is decreased to slow down the flow rate of the hot air, thereby reducing the energy consumption of the second air exhaust unit 27 during operation while ensuring the heat preservation of the nacelle 30. FIG. 4 may be an operating status of the system for cooling wind turbine generators when the wind turbine generator system is in a low-temperature environment.

In the system for cooling wind turbine generators of this embodiment, in a case that the temperature of the generator is higher than the first set temperature and the temperature of the nacelle is higher than the second set temperature, the first pipe air damper is opened, and the air exhaust device extracts the hot air generated by the generator into the air extraction pipe through the pipe inlet and exhausts the hot air to the outside of the nacelle through the first pipe outlet, thereby improving the cooling efficiency of the generator when the wind turbine generator system is in a high-temperature environment. In a case that the temperature of the nacelle is lower than or equal to the second set temperature, the second pipe air damper is opened, and the air exhaust device extracts the hot air generated by the generator into the air extraction pipe through the pipe inlet and exhausts the hot air to the inside of the nacelle through the second pipe outlet, so as to raise the temperature in the nacelle to a set temperature (such as the second set temperature) or keeping the temperature in the nacelle at the set temperature when the wind turbine generator system is in a low-temperature environment, thereby avoiding the need for providing multiple independent heating devices for parts and components of the wind turbine generator system, and reducing the cost and energy consumption. Compared with the conventional technology, the system for cooling wind turbine generators in this embodiment does not require a cooling device, thereby further saving the cost. The air extraction pipe in the system for cooling wind turbine generators in this embodiment may adopt a dual-pipe structure, which may actively control the heat exchange between the air inside and outside the nacelle, thereby not only cooling the generator, but also regulating the temperature in the nacelle. The hot air generated by the generator is recycled to raise the temperature in the nacelle.

Figure 5:
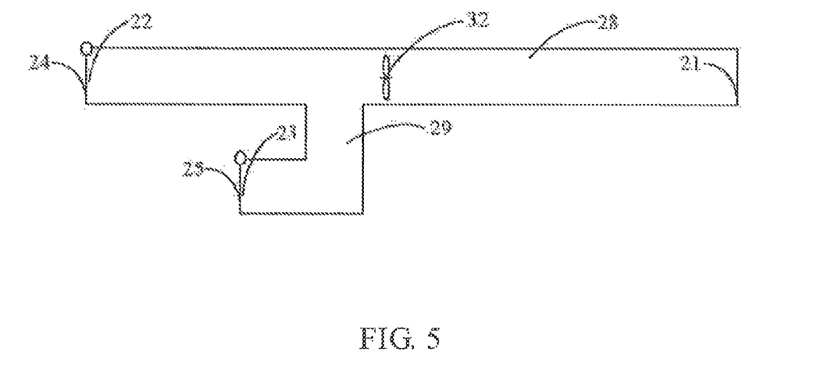
FIG. 5 is a schematic view showing the structure of a system for cooling wind turbine generators according to a second embodiment of the present application.

FIG. 5 is a schematic view showing the structure of a system for cooling wind turbine generators according to a second embodiment of the present application. Unlike the first embodiment, in this embodiment as shown in FIG. 5, the main pipe 28 includes a first pipe segment and a second pipe segment, the first pipe segment is a segment of the main pipe 28 which starts from an intersection of the main pipe 28 and the branch pipe 29 to the first pipe outlet 22, the second pipe segment is a segment of the main pipe 28 which starts from the intersection of the main pipe 28 and the branch pipe 29 to the pipe inlet 21, and the air exhaust device 32 is located in the second pipe segment. In this embodiment, one or more of the air exhaust devices 32 may be provided, and the air exhaust device 32 may be an exhaust fan. Compared with the technical solutions in the first embodiment, the technical solutions in this embodiment may reduce the number of the air exhaust devices, thereby saving the cost.

Figure 6:
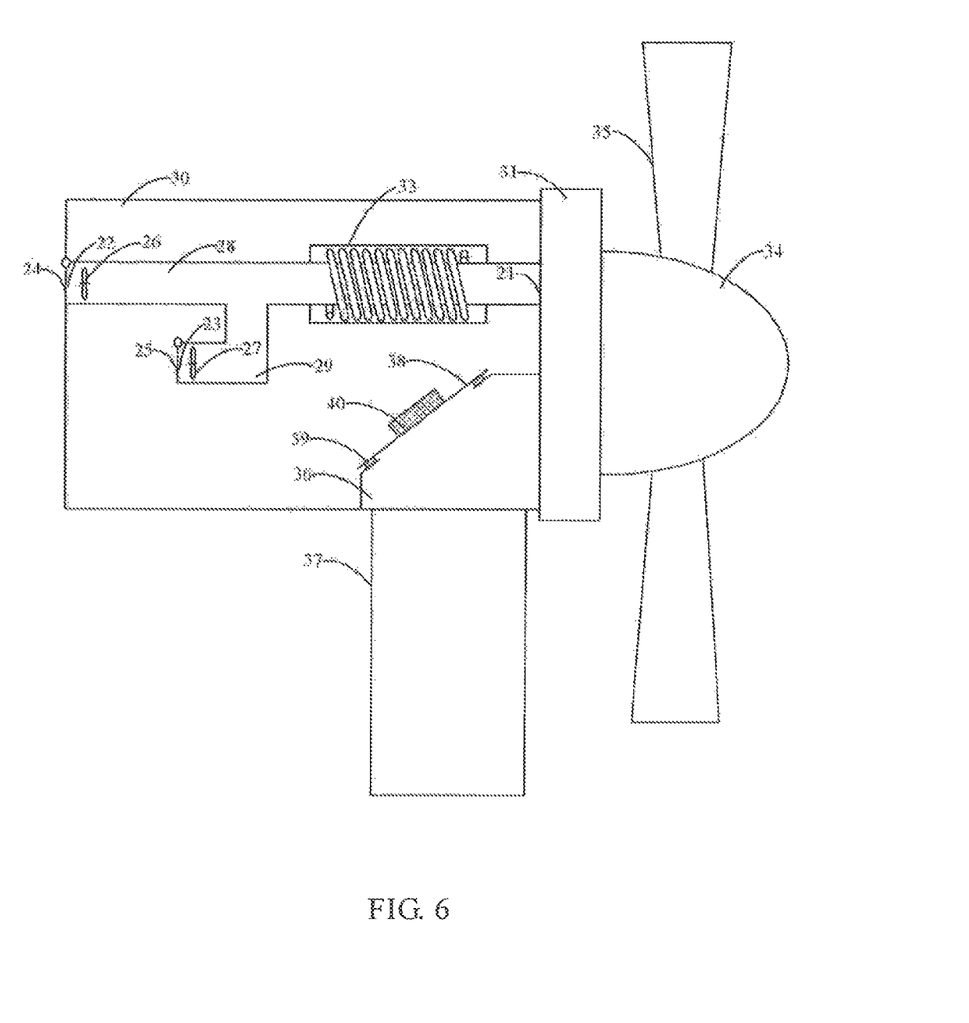
FIG. 6 is a schematic view showing the structure of a wind turbine generator system according to a third embodiment of the present application.

FIG. 6 a schematic view showing the structure of a wind turbine generator system according to a third embodiment of the present application. As shown in FIG. 6, the wind turbine generator system includes a generator 31, a nacelle 30, a hub 34, a blade 35 and a system for cooling the wind turbine generator. The blade 35 is connected to the generator 31 via the hub 34. The blade 35 rotates to drive a rotor shaft of the generator 31 to rotate to produce electricity. The generator 31 is connected to the nacelle 30, and the generator 31 and the nacelle 30 are enclosed. Air circulation between the generator 31 and the nacelle 30 is achieved by an air extraction pipe and an air inlet, and more particularly, the hot air generated by the generator 31 may be extracted by the air extraction pipe, and the air in the nacelle 30 may be sucked into the generator 31 through the air inlet after being filtered by a filter. The generator 31 may be located outside or inside the nacelle 30. In this embodiment, preferably, the generator 31 is located outside the nacelle 30.

The system for cooling wind turbine generators includes an air extraction pipe and an air exhaust device. The air extraction pipe is located in the nacelle 30 and is provided with a pipe inlet 21, a first pipe outlet 22 and a second pipe outlet 23.

The first pipe inlet 21 is in communication with the generator, the first pipe outlet 22 is provided with a first pipe air damper 24, and the second pipe outlet 23 is provided with a second pipe air damper 25. In a case that the temperature of the generator 31 is higher than the first set temperature and the temperature of the nacelle 30 is higher than the second set temperature, the first pipe air damper 24 is opened to communicate the first pipe outlet 22 with the outside of the nacelle 30. In a case that the temperature of the nacelle 30 is lower than or equal to the second set temperature, the second pipe air damper 25 is opened to communicate the second pipe outlet 23 with the inside of the nacelle 30. In a case that the temperature of the generator 31 is higher than the first set temperature and the temperature of the nacelle 30 is higher than the second set temperature, the air exhaust device is used to extract the hot air generated by the generator into the air extraction pipe through the pipe inlet 21 and exhaust the hot air to the outside of the nacelle 30 through the first pipe outlet 22; and in a case that the temperature of the nacelle 30 is lower than or equal to the second set temperature, the air exhaust device is used to extract the hot air generated by the generator 31 into the air extraction pipe through the pipe inlet 21 and exhaust the hot air to the inside of the nacelle 30 through the second pipe outlet 23.

In this embodiment, the air extraction pipe includes a main pipe 28 and a branch pipe 29. The main pipe 28 has one end functioning as the pipe inlet 21 and another end functioning as the first pipe outlet 22. The branch pipe 29 has one end in communication with the main pipe 28 and another end functioning as the second pipe outlet 23. In practical application, the air extraction pipe may be in other structures which are not detailed here.

In this embodiment, the air exhaust device may include a first air exhaust unit 26 and a second air exhaust unit 27. The first air exhaust unit 26 is located near the first pipe outlet 22 in the air extraction pipe, and the second air exhaust unit 27 is located near the second pipe outlet 23 in the air extraction pipe. In a case that the temperature of the generator 31 is higher than the first set temperature and the temperature of the nacelle 30 is higher than the second set temperature, the first air exhaust unit 26 is used to extract the hot air generated by the generator 31 into the air extraction pipe through the pipe inlet 21 and exhaust the hot air to the outside of the nacelle 30 through the first pipe outlet 22. In a case that the temperature of the nacelle 30 is lower than or equal to the second set temperature, the second air exhaust unit 27 is used to extract the hot air generated by the generator 31 into the air extraction pipe through the pipe inlet 21 and exhaust the hot air to the inside of the nacelle 30 through the second pipe outlet 23. In this embodiment, one or more of the first air exhaust units 26 may be provided, and one or more of the second air exhaust units 27 may be provided. The first air exhaust unit 26 and the second air exhaust unit 27 may each be an exhaust fan.

In this embodiment, a temperature sensor may be used to monitor the temperature of the generator and the temperature of the nacelle. A central processing unit of the wind turbine generator system may be used to open or close the first air exhaust unit 26 and the first pipe air damper 24, or open or close the second air exhaust unit 27 and the second pipe air damper 25.

The operating principles of the system for cooling wind turbine generators in this embodiment will be described in detail in conjunction with FIGS. 7 and 8.

Figure 7:
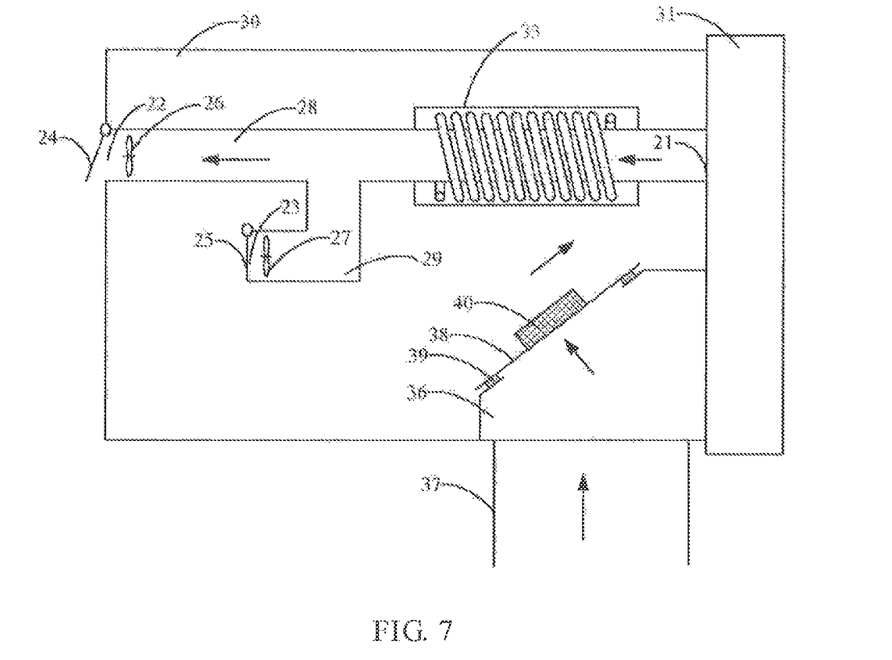
FIG. 7 is an operation schematic diagram of a system for cooling wind turbine generators in the third embodiment.

FIG. 7 is an operation schematic diagram of a system for cooling wind turbine generators in the third embodiment. As shown in FIG. 7, when the generator 31 is in operation, in a case that the temperature of the generator 31 is higher than the first set temperature and the temperature of the nacelle 30 is higher than the second set temperature, the first air exhaust unit 26 is started and the first pipe air damper 24 is opened, thus the first pipe outlet 22 is communicated with the outside of the nacelle 30. The first air exhaust unit 26 extracts the hot air generated by the generator 31 into the air extraction pipe through the pipe inlet 21 and exhausts the hot air to the outside of the nacelle 30 through the first pipe outlet 22. At this time, the second air exhaust unit 27 is shut and the second pipe air damper 25 is closed. A rotational frequency of the first air exhaust unit 26 may be adjusted according to the temperature of the generator 31, so as to realize an object of controlling the flow rate of the hot air according to the temperature of the generator 31, thus two objects of improving the cooling efficiency of the generator 31 and reducing the energy consumption of the first air exhaust unit 26 may be balanced. In detail, when the temperature of the generator 31 rises, the rotational frequency of the first air exhaust unit 26 is increased to speed up the flow rate of the hot air, so as to exhaust the hot air faster to the outside of the nacelle 30 through the first pipe outlet 22, thereby improving the cooling effect of the generator 31. When the temperature of the generator 31 drops, the rotational frequency of the first air exhaust unit 26 is decreased to slow down the flow rate of the hot air, thereby reducing the energy consumption of the first air exhaust unit 26 during operation while ensuring the cooling effect of the generator 31. FIG. 7 may be an operating status of the system for cooling wind turbine generators when the wind turbine generator system is in a high-temperature environment.

Figure 8:
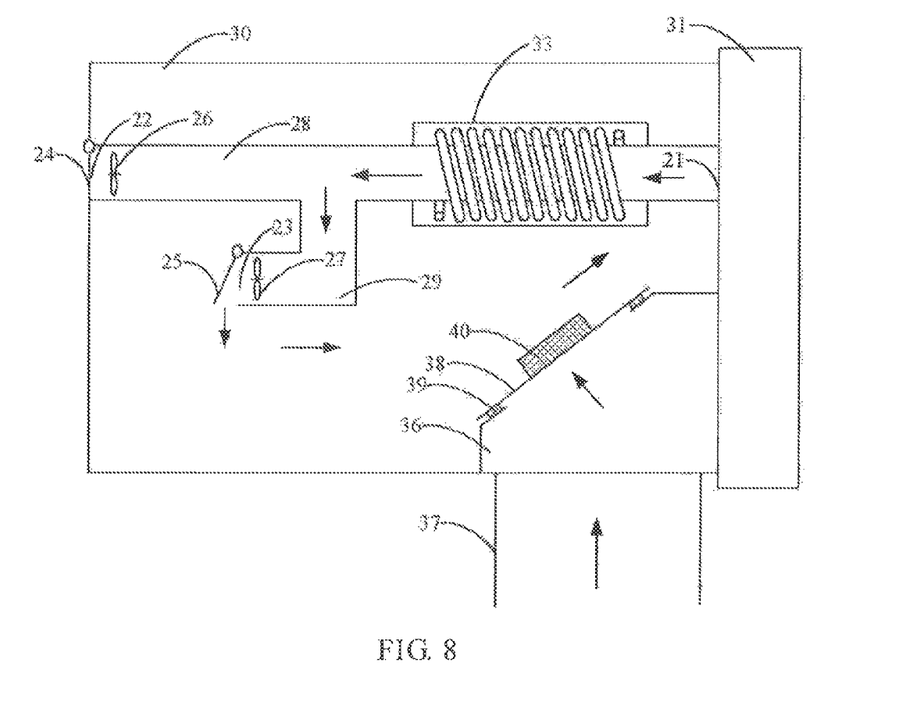
FIG. 8 is another operation schematic diagram of the system for cooling wind turbine generators in the third embodiment.

FIG. 8 is another operation schematic diagram of the system for cooling wind turbine generators in the third embodiment. As shown in FIG. 8, when the generator 31 is in operation, in a case that the temperature of the nacelle 30 is lower than or equal to the second set temperature, the second air exhaust unit 27 is started and the second pipe air damper 25 is opened, thus the second pipe outlet 23 is communicated with the inside of the nacelle 30. The second air exhaust unit 27 extracts the hot air generated by the generator 31 into the air extraction pipe through the pipe inlet 21 and exhausts the hot air to the inside of the nacelle 30 through the second pipe outlet 23, which raises the temperature in the nacelle 30, thereby realizing the heat preservation of the nacelle 30. At this time, the first air exhaust unit 26 is shut and the first pipe air damper 24 is closed. A rotational frequency of the second air exhaust unit 27 may be adjusted according to the temperature of the nacelle 30, so as to realize an object of controlling the flow rate of the hot air according to the temperature of the nacelle 30, thus two objects of ensuring the heat preservation of the nacelle 30 and reducing the energy consumption of the second air exhaust unit 27 may be balanced. In detail, when the temperature of the nacelle 30 drops, the rotational frequency of the second air exhaust unit 27 is increased to speed up the flow rate of the hot air, so as to exhaust the hot air faster to the inside of the nacelle 30 through the second pipe outlet 23, thereby improving the heat preservation in the nacelle 30. When the temperature in the nacelle 30 rises, the rotational frequency of the second air exhaust unit 27 is decreased to slow down the flow rate of the hot air, thereby reducing the energy consumption of the second air exhaust unit 27 during operation while ensuring the heat preservation of the nacelle 30. FIG. 8 may be an operating status of the system for cooling wind turbine generators when the wind turbine generator system is in a low-temperature environment.

Optionally, the wind turbine generator system may further include a heating device 33 arranged in the nacelle 30, and the heating device 33 is used for heating the nacelle 30. Preferably, the heating device 33 is arranged on the air extraction pipe. As shown in FIG. 8, when the wind turbine generator system is in a low-temperature environment, the temperature in the nacelle 30 fails to meet the normal operating temperature for various parts and components and electrical elements. In this case, if the generator 31 is out of service for a long time and needs to restart, the heating device 33 may be started for heating the nacelle 30 to raise the temperature in the nacelle 30 to the normal operating temperature for various parts and components and electrical elements. When the heating device 33 is in operation, the first air exhaust unit 26 is shut and the first pipe outlet 22 is closed, and the second air exhaust unit 27 is started and the second pipe outlet 23 is opened. By arranging the heating device 33 on the air extraction pipe, the second air exhaust unit 27 in operation may convey the hot air generated by the heating device 33 to the inside of the nacelle 30, thereby raising the temperature in the nacelle 30 faster and more efficiently.

Further, the wind turbine generator system may include a base 36 and a tower 37. The base 36 is arranged in the nacelle 30, the nacelle 30 is arranged on the tower 37 via the base 36, and the tower 37 is used to support the nacelle 30. A sealing cover 38 is arranged above the base 36. The sealing cover 38 may be arranged above the base 36 via a sealing gasket 39. The sealing cover 38 is provided with an air filter apparatus 40 which may be used to filter the air entering the nacelle 30 from the tower 37. The air filter apparatus 40 may be a protruding mesh cover on the sealing cover 38. Further, a handle, which is not shown in the figures, may be provided on the sealing cover 38 for the operator to open the sealing cover 38.

The nacelle 30 in this embodiment is an enclosed structure, which may increase the cleanliness in the wind turbine generator system, thereby improving the insulation capacity and protection capacity of the generator. To seal the nacelle 30, the wind turbine generator system may further include a sealing structure, which may be a peripheral sealing structure arranged at the junction of a yaw system, a root of the blade 35, a cover of the nacelle 30, a rotor and a stator of the generator 31 and other components.

Optionally, the system for cooling wind turbine generators in the wind turbine generator system in this embodiment may adopt the system for cooling wind turbine generators according to the second embodiment as shown in FIG. 2 and will not be specifically described herein.

In the wind turbine generator system provided in this embodiment, in a case that the temperature of the generator is higher than the first set temperature and the temperature of the nacelle is higher than the second set temperature, the first pipe air damper is opened, and the air exhaust device extracts the hot air generated by the generator into the air extraction pipe through the pipe inlet and exhausts the hot air to the outside of the nacelle through the first pipe outlet, thereby improving the cooling efficiency of the generator when the wind turbine generator system is in a high-temperature environment. In a case that the temperature of the nacelle is lower than or equal to the second set temperature, the second pipe air damper is opened, and the air exhaust device extracts the hot air generated by the generator into the air extraction pipe through the pipe inlet and exhausts the hot air to the inside of the nacelle through the second pipe outlet, so as to raise the temperature in the nacelle for heat preservation when the wind turbine generator system is in a low-temperature environment, thereby avoiding the need for providing multiple independent heating devices for parts and components of the wind turbine generator system, and reducing the cost and energy consumption. Compared with the conventional technology, the system for cooling wind turbine generators in this embodiment does not require a cooling device, thereby further saving the cost.

The air extraction pipe in the wind turbine generator system in this embodiment may adopt a dual-pipe structure, which may actively control the heat exchange between the air inside and outside the nacelle, thereby not only cooling the generator, but also regulating the temperature in the nacelle. The hot air generated by the generator is recycled to raise the temperature in the nacelle.

A method for cooling wind turbine generators is provided according to a fourth embodiment of the present application based on the system for cooling wind turbine generators. The system for cooling wind turbine generators includes an air extraction pipe and an air exhaust device. The air extraction pipe is located in a nacelle and is provided with a pipe inlet, a first pipe outlet and a second pipe outlet. The pipe inlet is in communication with a generator, the first pipe outlet is provided with a first pipe air damper, and the second pipe outlet is provided with a second pipe air damper.

The method for cooling wind turbine generators may includes the following steps.

Step 101 may include monitoring a temperature of the generator and a temperature of the nacelle, and proceeding to Step 102 in a case that the temperature of the generator is higher than a first set temperature and the temperature of the nacelle is higher than a second set temperature; and proceeding to Step 103 in a case that the temperature of the nacelle is lower than or equal to the second set temperature.

Step 102 may include opening the first pipe air damper to communicate the first pipe outlet with an outside of the nacelle; and extracting, by the air exhaust device, hot air generated by the generator into the air extraction pipe through the pipe inlet and exhausting, by the air exhaust device, the hot air to the outside of the nacelle through the first pipe outlet.

Step 103 may include opening the second pipe air damper to communicate the second pipe outlet with an inside of the nacelle; and extracting, by the air exhaust device, hot air generated by the generator into the air extraction pipe through the pipe inlet and exhausting, by the air exhaust device, the hot air to the inside of the nacelle through the second pipe outlet.

In the technical solutions of the method for cooling wind turbine generators provided in this embodiment, in a case that the temperature of the generator is higher than the first set temperature and the temperature of the nacelle is higher than the second set temperature, the first pipe air damper is opened, and the air exhaust device extracts the hot air generated by the generator into the air extraction pipe through the pipe inlet and exhausts the hot air to the outside of the nacelle through the first pipe outlet, thereby improving the cooling efficiency of the generator when the wind turbine generator system is in a high-temperature environment. In a case that the temperature of the nacelle is lower than or equal to the second set temperature, the second pipe air damper is opened, and the air exhaust device extracts the hot air generated by the generator into the air extraction pipe through the pipe inlet and exhausts the hot air to the inside of the nacelle through the second pipe outlet, so as to raise the temperature in the nacelle for heat preservation when the wind turbine generator system is in a low-temperature environment, thereby avoiding the need for providing multiple independent heating devices for parts and components of the wind turbine generator system, and reducing the cost and energy consumption. The method for cooling wind turbine generators provided in this embodiment may actively control the heat exchange between the air inside and outside the nacelle, thereby not only cooling the generator, but also regulating the temperature in the nacelle. The hot air generated by the generator is recycled to raise the temperature in the nacelle.

It can be understood that, the first set temperature and the second set temperature are each a temperature threshold value which is pre-set according to the practical operation of the wind turbine. In determining the temperature threshold value, the following factors are generally required to be considered, for example, the environment of the wind turbine, a generator operation temperature range required for ensuring the normal operation of the generator, and a nacelle operation temperature range required for ensuring the normal operation of various parts and components and electrical elements in the nacelle. The value of the first set temperature is required to be in the generator operation temperature range required for ensuring the normal operation of the generator, and the value of the second set temperature is required to be in the nacelle operation temperature range required for ensuring the normal operation of various parts and components and electrical elements in the nacelle.

It can be understood that, the above embodiments are merely exemplary embodiments used to illustrate the principles of the present application, and the present application is not limited to this. For person skilled in the art, various changes and modifications may be made without departing front the spirit and essence of the present application, and these changes and modifications are deemed to fall into the scope of the present application.

What is claimed is:

1. A system for cooling wind turbine generators, comprising an air extraction pipe and an air exhaust device, wherein the air extraction pipe is located in a nacelle and is provided with a pipe inlet, a first pipe outlet and a second pipe outlet, the pipe inlet is in communication with a generator, the first pipe outlet is provided with a first pipe air damper, and the second pipe outlet is provided with a second pipe air damper;

in a case that a temperature of the generator is higher than a first set temperature and a temperature of the nacelle is higher than a second set temperature, the first pipe air damper is configured to be opened to communicate the first pipe outlet with an outside of the nacelle;

in a case that the temperature of the nacelle is lower than or equal to the second set temperature, the second pipe air damper is configured to be opened to communicate the second pipe outlet with an inside of the nacelle; and in a case that the temperature of the generator is higher than the first set temperature and the temperature of the nacelle is higher than the second set temperature, the air exhaust device is configured to extract hot air generated by the generator into the air extraction pipe through the pipe inlet and exhaust the hot air to the outside of the nacelle through the first pipe outlet; and in a case that the temperature of the nacelle is lower than or equal to the second set temperature, the air exhaust device is configured to extract the hot air generated by the generator into the air extraction pipe through the pipe inlet and exhaust the hot air to the inside of the nacelle through the second pipe outlet.

2. The system for cooling wind turbine generators according to claim 1, wherein, the air extraction pipe comprises a main pipe and a branch pipe, one end of the main pipe is the pipe inlet and another end of the main pipe is the first pipe outlet, and one end of the branch pipe is in communication with the main pipe and another end of the branch pipe is the second pipe outlet.

3. The system for cooling wind turbine generators according to claim 2, wherein, the main pipe comprises a first pipe segment and a second pipe segment, the first pipe segment is starting from an intersection of the main pipe and the branch pipe to the first pipe outlet, the second pipe segment is starting from the intersection of the main pipe and the branch pipe to the pipe inlet, and the air exhaust device is located in the second pipe segment.

4. The system for cooling wind turbine generators according to claim 2, wherein, the air exhaust device comprises a first air exhaust unit and a second air exhaust unit, the first air exhaust unit is located near the first pipe outlet in the air extraction pipe, and the second air exhaust unit is located near the second pipe outlet in the air extraction pipe;
in a case that the temperature of the generator is higher than the first set temperature and the temperature of the nacelle is higher than the second set temperature, the first air exhaust unit is configured to extract the hot air generated by the generator into the air extraction pipe through the pipe inlet and exhaust the hot air to the outside of the nacelle through the first pipe outlet; and
in a case that the temperature of the nacelle is lower than or equal to the second set temperature, the second air exhaust unit is configured to extract the hot air generated by the generator into the air extraction pipe through the pipe inlet and exhaust the hot air to the inside of the nacelle through the second pipe outlet.

5. The system for cooling wind turbine generators according to claim 4, wherein, a rotational frequency of the first air exhaust unit is adjustable according to the temperature of the generator, and a rotational frequency of the second air exhaust unit is adjustable according to the temperature of the nacelle.

6. The system for cooling wind turbine generators according to claim 1, wherein, the air exhaust device comprises a first air exhaust unit and a second air exhaust unit, the first air exhaust unit is located near the first pipe outlet in the air extraction pipe, and the second air exhaust unit is located near the second pipe outlet in the air extraction pipe;
in a case that the temperature of the generator is higher than the first set temperature and the temperature of the nacelle is higher than the second set temperature, the first air exhaust unit is configured to extract the hot air generated by the generator into the air extraction pipe through the pipe inlet and exhaust the hot air to the outside of the nacelle through the first pipe outlet; and
in a case that the temperature of the nacelle is lower than or equal to the second set temperature, the second air exhaust unit is configured to extract the hot air generated by the generator into the ar extraction pipe through the pipe inlet and exhaust the hot air to the inside of the nacelle through the second pipe outlet.

7. The system for cooling wind turbine generators according to claim 6, wherein, a rotational frequency of the first air exhaust unit is adjustable according to the temperature of the generator, and a rotational frequency of the second air exhaust unit is adjustable according to the temperature of the nacelle.

8. A wind turbine generator system, comprising a generator, a nacelle, a hub, blades and a system for cooling a wind turbine generator, the blades being connected to the generator through the hub, wherein, the system for cooling the wind turbine generator comprises an air extraction pipe and an air exhaust device, wherein the air extraction pipe is located in the nacelle and is provided with a pipe inlet, a first pipe outlet and a second pipe outlet, the pipe inlet is in communication with the generator, the first pipe outlet is provided with a first pipe air damper, and the second pipe outlet is provided with a second pipe air damper;
in a case that a temperature of the generator is higher than a first set temperature and a temperature of the nacelle is higher than a second set temperature, the first pipe air damper is configured to be opened to communicate the first pipe outlet with an outside of the nacelle;
in a case that the temperature of the nacelle is lower than or equal to the second set temperature, the second pipe air damper is configured to be opened to communicate the second pipe outlet with an inside of the nacelle; and
in a case that the temperature of the generator is higher than the first set temperature and the temperature of the nacelle is higher than the second set temperature, the air exhaust device is configured to extract hot air generated by the generator into the air extraction pipe through the pipe inlet and exhaust the hot air to the outside of the nacelle through the first pipe outlet; and in a case that the temperature, of the nacelle is lower than or equal to the second set temperature, the air exhaust device is configured to extract the hot air generated by the generator into the air extraction pipe through the pipe inlet and exhaust the hot air to the inside of the nacelle through the second pipe outlet.

9. The wind turbine generator system according to claim 8, further comprising a heating device arranged on the air extraction pipe; and
the heating device is configured to heat the nacelle.

10. The wind turbine generator system according to claim 9, further comprising a base and a tower, wherein the base is arranged in the nacelle, the nacelle is arranged on the tower via the base, and the tower is configured to support the nacelle.

11. The wind turbine generator system according to claim 10, wherein, a sealing cover is arranged above the base, the sealing cover is mounted on the base via a sealing gasket and is provided with an air filter apparatus, and the air filter apparatus is configured to filter air entering the nacelle from the tower.

12. The wind turbine generator system according to claim 8, wherein, the air extraction pipe comprises a main pipe and a branch pipe, one end of the main pipe is the pipe inlet and another end of the main pipe is the first pipe outlet, and one end of the branch pipe is in communication with the main pipe and another end of the branch pipe is the second pipe outlet.

13. The wind turbine generator system according to claim 12, wherein, the main pipe comprises a first pipe segment and a second pipe segment, the first pipe segment is starting from an intersection of the main pipe and the branch pipe to the first pipe outlet, the second pipe segment is starting from the intersection of the main pipe and the branch pipe to the pipe inlet, and the air exhaust device is located in the second pipe segment.

14. The wind turbine generator system according to claim 8, wherein, the air exhaust device comprises a first air exhaust unit and a second air exhaust unit, the first air exhaust unit is located near the first pipe outlet in the air extraction pipe, and the second air exhaust unit is located near the second pipe outlet in the air extraction pipe;
in a case that the temperature of the generator is higher than the first set temperature and the temperature of the nacelle is higher than the second set temperature, the first air exhaust unit is configured to extract the hot air generated by the generator into the air extraction pipe through the pipe inlet and exhaust the hot air to the outside of the nacelle through the first pipe outlet; and
in a case that the temperature of the nacelle is lower than or equal to the second set temperature, the second air exhaust unit is configured to extract the hot air generated by the generator into the air extraction pipe through the pipe inlet and exhaust the hot air to the inside of the nacelle through the second pipe outlet.

15. The wind turbine generator system according to claim 14, wherein, a rotational frequency of the first air exhaust unit is adjustable according to the temperature of the generator, and a rotational frequency of the second air exhaust unit is adjustable according to the temperature of the nacelle.

16. A method for cooling wind turbine generators, wherein, the method is based on a system for cooling wind turbine generators, wherein the system for cooling wind turbine generators comprises an air extraction pipe and an air exhaust device, the air extraction pipe is located in a nacelle and is provided with a pipe inlet, a first pipe outlet and a second pipe outlet, the pipe inlet is in communication with a generator, the first pipe outlet is provided with a first pipe air damper, and the second pipe outlet is provided with a second pipe air damper;

the method comprises:

monitoring a temperature of the generator and a temperature of the nacelle;

in a case that the temperature of the generator is higher than a first set temperature and the temperature of the nacelle is higher than a second set temperature, opening the first pipe air damper to communicate the first pipe outlet with an outside of the nacelle; and extracting, by the air exhaust device, hot air generated by the generator into the air extraction pipe through the pipe inlet and exhausting, by the air exhaust device, the hot air to the outside of the nacelle through the first pipe outlet; and in a case that the temperature of the nacelle is lower than or equal to the second set temperature, opening the second pipe air damper to communicate the second pipe outlet with an inside of the nacelle; and extracting, by the air exhaust device, hot air generated by the generator into the air extraction pipe through the pipe inlet and exhausting, by the air exhaust device, the hot air to the inside of the nacelle through the second pipe outlet.

* * * * *

UNITED STATES PATENT AND TRADEMARK OFFICE
CERTIFICATE OF CORRECTION

| | | |
|---|---|---|
| PATENT NO. | : 9,273,670 B2 | Page 1 of 1 |
| APPLICATION NO. | : 14/381584 | |
| DATED | : March 1, 2016 | |
| INVENTOR(S) | : Xiaoqian Li et al. | |

It is certified that error appears in the above-identified patent and that said Letters Patent is hereby corrected as shown below:

In the Claims

Claim 6, col. 13, line 47, "ar extraction" should read

--air extraction--.

Signed and Sealed this
Thirty-first Day of May, 2016

Michelle K. Lee
*Director of the United States Patent and Trademark Office*